April 23, 1940.     W. A. HOWARD ET AL     2,198,534
SPOT WELDER FOR LINING CLOSED VESSELS
Filed Nov. 4, 1938     2 Sheets-Sheet 2
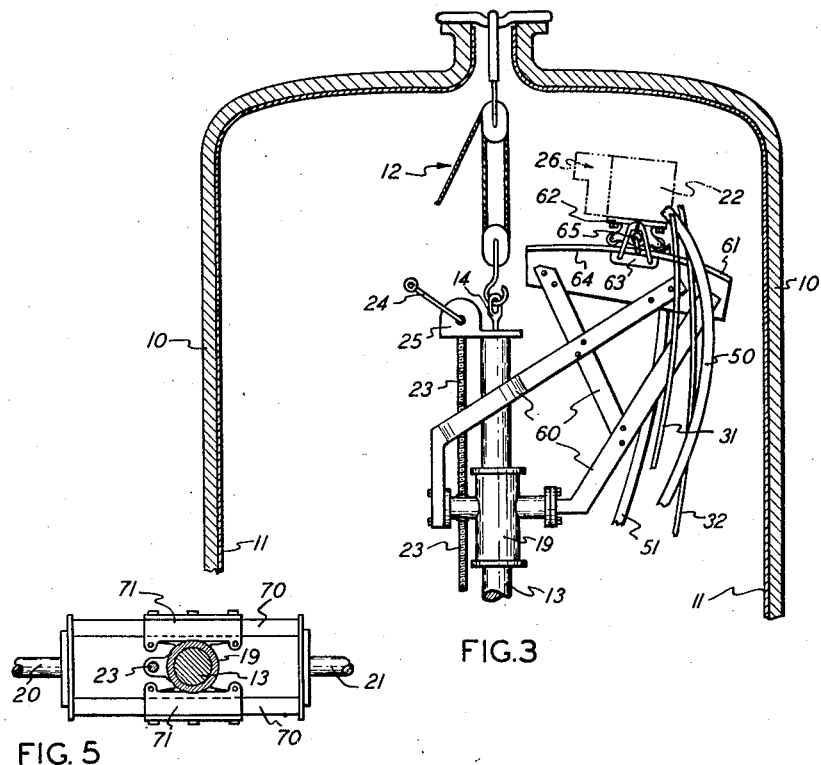
FIG. 3
FIG. 5
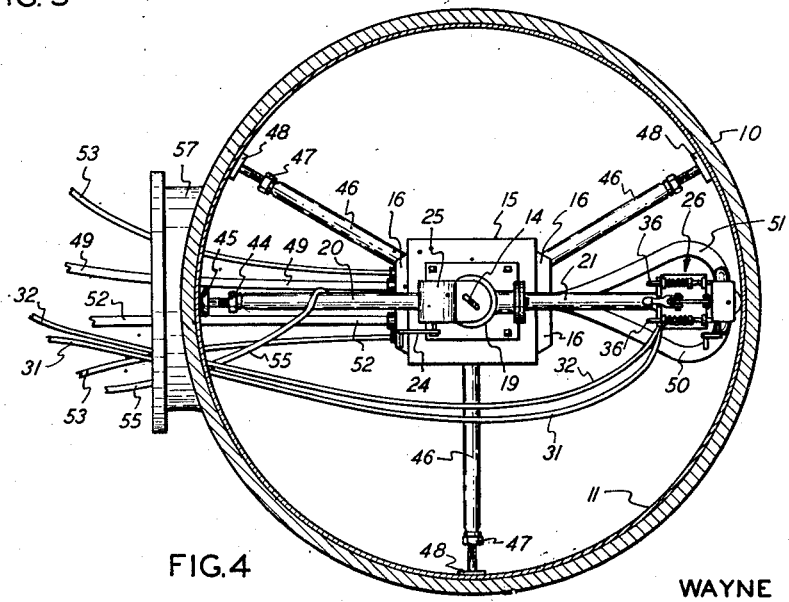
FIG. 4
WAYNE A. HOWARD
TURNER C. SMITH
INVENTORS
ATTORNEY Patented Apr. 23, 1940

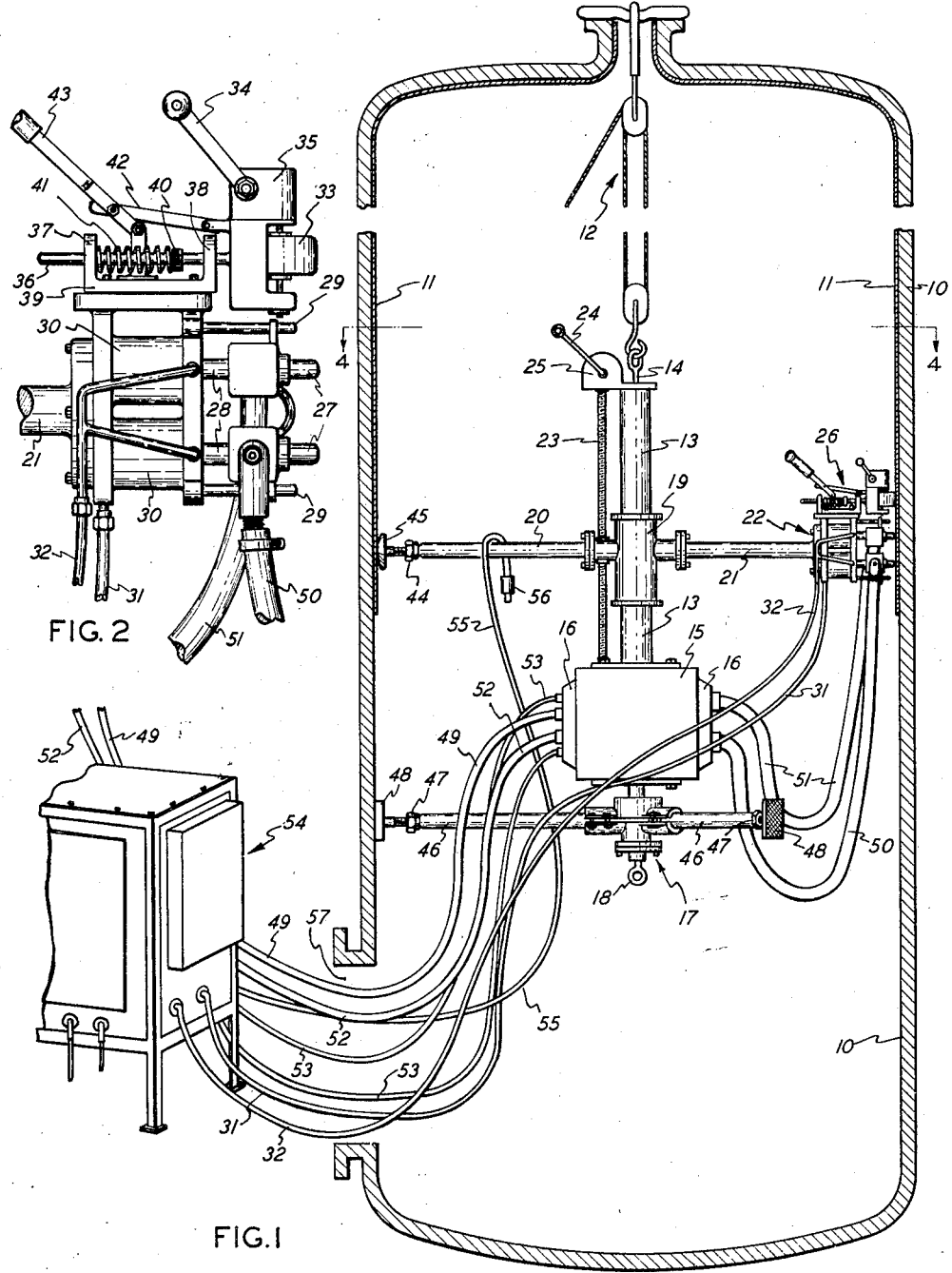

2,198,534

UNITED STATES PATENT OFFICE 2,198,534

SPOT WELDER FOR LINING CLOSED VESSELS

Wayne A. Howard, Manhasset, N. Y., and Turner C. Smith, Huntington Park, Calif., assignors to Socony-Vacuum Oil Company, Incorporated, New York, N. Y., a corporation of New York Application November 4, 1938, Serial No. 238,850

6 Claims. (Cl. 219—4)

In such arts as petroleum refining and the chemical industry, use is frequently made of metallic vessels cylindrical in form with outwardly dished heads. Such vessels often have no opening larger than an 18 inch manhole, and invariably the means of access to the interior is restricted.

But for most purposes it is desirable or necessary that these vessels be lined with an alloy more resistant to corrosion, erosion, or both, than the material of the vessel itself. The preferred method of fastening such linings in place is by spot-welding; however, it has been so difficult to perform a large number of welds within a completely fabricated vessel that the usual practice has been to weld the lining material to the flat plates from which the vessel is subsequently formed. This method, though useful, has obvious disadvantages, principal of which is that it is completely inapplicable to the problem of replacing liners in worn vessels, or of lining vessels originally constructed without liners. It may or may not be of importance, depending on circumstances, that unnecessary stresses are created in the lining material by the step of forming the flat composite plates into curved members of a cylindrical vessel.

The object of our invention is to provide an apparatus with which linings may be welded in place within completely formed cylindrical vessels with outwardly dished heads, and with which such welding may be done with economy of time and labor and with dependably high quality of work. Further objects will appear from a consideration of the attached drawings and the following description thereof, in which:

Fig. 1 is a view in elevation of our welding device in operative position for welding the cylindrical portion of a vertically disposed vessel, the vessel being represented diagrammatically in section.

Fig. 2 is an enlarged view of the welding head and the lateral control device which are shown in relation to other parts in Fig. 1.

Fig. 3 is a view similar to Fig. 1 of the upper portion of our device, showing an adaption suitable for welding the dish-shaped heads of vessels. In this view the welding head and lateral control device are omitted to avoid unnecessary duplication of detail, the position of these assemblies being represented by broken lines.

Fig. 4 is a plan view of the apparatus of Fig. 1, on the line 4—4 of that figure.

Fig. 5 is a detail, in plan view and horizontal section, showing an alternative method of mounting arms 20 and 21 upon sleeve 19.

Referring to Fig. 1, 10 is the wall of a vertically disposed vessel, as for example a bubble tower shell. 11 represents the lining material, of corrosion-resistant alloy, which is to be welded in place. From the center of the upper head of the vessel is suspended the tackle 12, which may be replaced by any preferred hoisting equipment. This tackle in turn supports the welding device.

The cylindrical member 13 is suspended by the eye 14 from the hoist 12. "Cylindrical" is here used in its broad sense, as referring to any geometrical form generated by a straight line moving always parallel to a fixed line, such as a circular cylinder or a prism. Attached at the lower end of cylindrical member 13 is the transformer case 15 containing the transformer 16. Below the transformer case is pivotally attached the spider, preferably of three legs, generally indicated at 17. Beneath spider 17 is attached eye 18, to be used in suspending the welder in inverted position for welding the lower head and adjacent parts of the vessel.

The sleeve 19 is slidably mounted on cylinder 13; attached to this sleeve are the laterally extending arms 20 and 21, 20 being a bucking bar or strut and 21 being the supporting bar for the welding head generally indicated at 22. The sleeve 19 (and members attached to it) is raised or lowered and held in position by the screw 23 which acts upon a threaded opening provided in one of the projections extending from sleeve 19. Screw 23 is rotated by crank 24 through the medium of conventional bevel gears (not shown) in housing 25.

An alternative construction is shown in Fig. 5, in which arms 20 and 21 are not directly attached to the sleeve 19, but are rigidly attached to one another by the bars 70—70, and these bars are mounted slidably in the guides 71—71, which are rigidly attached to the sleeve 19. This construction has the advantages of requiring less exact centering of the cylindrical member 13 and of operating more conveniently in vessels of irregular roundness.

The outer end of supporting bar 21 carries the welding head generally indicated at 22 and the lateral control device generally indicated at 26. The welding head is of the type known to those versed in the art as a "series" or "duplex" spot welder, in which the two electrodes (27—27) are on the same side of the work and separated from one another by a suitable distance, and in which each electrode produces a spot weld at each operation. The jumper-bar often used with this type of welder, on the opposite side of the work from the electrodes to conduct the current from one welding zone to the other, is unnecessary in this application, the outer wall 10 of the vessel being of such thickness that it successfully performs the function of the jumper-bar. A particularly large proportion of the current will flow effectively through the weld zones, since the electrical resistivity of alloy steel such as is contemplated for use as lining material is relatively high.

This welding head comprises the conventional water-cooled electrodes 27—27 of a resistance welder, each of which electrodes, together with the attached connections for water and electricity, is mounted on a piston rod 28. Motion of the electrode assemblies is directed by guide-rods 29—29 and actuated by compressed air in double-acting pneumatic cylinders 30—30. When a weld is about to be made, compressed air enters the rear ends (left-hand ends as in Figs. 1 and 2) of the cylinders through air hose 31, forcing each of the electrodes with equal pressure against the wall of the vessel, thereby making a good welding contact between the lining material 11 and the wall 10 of the vessel immediately in front of each electrode. This pressure acts against the opposite wall through the medium of bucking bar 20. After the weld is complete, the electrodes are retracted by compressed air entering the forward ends (right-hand ends as in Figs. 1 and 2) of the cylinders through air hose 32. This welding head is not in itself the subject matter of this invention, it and its constituent parts being well known in the art, and it is believed that its type is unmistakably defined by the above description; therefore further description of it is thought unnecessary.

The lateral control device 26 comprises the wheel 33 which engages the wall of the vessel, and which may be rotated by crank 34 through the medium of conventional gears (not shown), such as worm and pinion, in housing 35. This wheel functions to move the welding head from point to point about the circumference of the vessel, and to hold it in place when a weld is to be made. Housing 35 and members carried by it, including wheel 33, are supported by a pair of rods 36—36 which are free to slide through holes provided in lugs 37 and 38, said lugs being integrally formed with plate 39 which is bolted to the upper part of welding head 22. Each of the rods 36 is provided with a collar 40 and a helical spring 41, the helical spring being in compression between collar 40 and rear lug 37, and serving to force wheel 33 into contact with the wall of the vessel, with moderate pressure. Also attached to housing 35 is link 42 which, drawn by toggle lever 43, functions to retract wheel 33 from the wall of the vessel and to hold it retracted while vertical movements of the welding head are made.

Bucking bar 20 is provided with length adjustment 44 and shoe 45; likewise, spider-legs 46—46 are provided with length adjustments 47—47 and shoes 48—48. Shoes 48—48 are provided with non-skid surfaces in order that spider 17 (and thereby the entire apparatus) may be more successfully held fixed in position; but shoe 45 is provided with a smooth, anti-friction surface in order that when the apparatus is rotated by means of control device 26, the friction between the vessel and the shoe 45 will not offer trouble-some resistance. In some cases it may be desirable to replace shoe 45 with a wheel.

Transformer 16 is a conventional electrical welding transformer with water-cooled secondary, capable of producing sufficient current at suitable voltage for duplex resistance welding, and being of proper design to pass through an opening which may be as small as 18 inches in diameter. The cooling jacket of the transformer is in two parts, water passes from the source of supply (not shown) through hose 49 into one portion of the cooling jacket, thence through the water-cooled electrical conduit 50 to welding head 22. Here the water is circulated through the interior of electrodes 27—27 in conventional manner, then returned to the transformer, this time to the other portion of the cooling jacket, through the other water-cooled conduit 51. From the transformer water is conducted by hose 52, either to discard or to a cooling apparatus to be prepared for recirculation.

High magnitude, low voltage current is carried from the secondary of the transformer 16 to the electrodes 27—27 by means of the water-cooled conduits 50 and 51; the primary coil is supplied with current through cables 53—53, which lead from an automatic welding contactor and timer mounted in a cabinet 54 outside the vessel. Air hoses 31 and 32 also lead from this cabinet, which includes automatic air control; so also does control cable 55 by which the operator can initiate the welding process.

The air control and welding contactor and timer contained in cabinet 54 are not herein described, since they and their combination are known in the art and do not form a part of the subject matter of this invention. Such resistance welding controls are thoroughly described in standard literature, as in the Welding Handbook (1938 edition) published by the American Welding Society of 33 West Thirty-Ninth Street, New York city, chapter 14, "Resistance Welding Controls" (pp. 220–250) by C. Stansbury and in references cited at the end of said chapter. We prefer, but do not limit ourselves to controls of the electronic type as described in said chapter, page 240 et seq.

The controls selected for use with our invention should be chosen so as to function in the following manner:

When the switch 56 on control cable 55 is pressed by the operator, compressed air is admitted to air hose 31, pressing the electrodes against the wall of the vessel. Immediately thereupon the electrical circuit through the power source and the transformer primary is closed, thereby inducing heavy current in the secondary or welding circuit. This flow of electricity is maintained for the period of time necessary to fuse sufficiently the metal in the weld zones, which period is dependent upon the thicknesses and compositions of material in the lining and in the wall of the vessel, but which will never be more than a fraction of a second. After another momentary period of time, sufficient to permit the fused metal of the weld to congeal, air pressure is released in air hose 31 and applied in air hose 32, thus retracting the electrodes. The automatic control is then inactive until the operator again presses switch 56, which initiates a repetition of the process. The amount of pressure and the lengths of time intervals should be subject to control to adapt the apparatus to use with materials of varying thickness and composition.

Air hose 31 and 32, water hose 49 and 52, electrical cables 53—53, and control cable 55 pass into the vessel through manhole 57 as shown.

This apparatus may be adapted for use in horizontally disposed vessels by substituting for eye 14 a second spider 17 and by providing means for the horizontal movement of the device, such as wheels with releasable brakes in place of the shoes 48—48 of both spiders.

The apparatus so far described serves admirably for welding the cylindrical portion of the vessel, but an adaptation must be provided for welding the dish-shaped heads. This adaptation is shown in Fig. 3.

In lieu of lateral arms 20 and 21 of Fig. 1, framework 60 is attached to sleeve 19. This framework supports track 61, which is of the proper size and curvature for welding the head of the vessel. Since such vessels are ordinarily made in only a few standard shapes and sizes, only a few such replaceable tracks will serve for all ordinary needs. The welding head 22 is bolted to a carriage 62 adapted to run on track 61. This carriage is provided with a brake shoe 63 (or a pair of such shoes) which can be drawn against the under side 64 of track 61 by means of cam 65, thereby holding the welding head fixed in any desired radial position. Cam 65 acts upon brake shoe 63 through spring-like rods. Circumferential adjustment, as in the previous case, is accomplished by means of control device 26. Brake shoe (or shoes) 63 also functions to support the carriage and welding head when the apparatus is in inverted position, as for welding the lower head.

It would be possible, though impractical, to provide a strut analogous to bucking bar 20 to transmit the reactive force of cylinders 30—30 to the opposite head of the vessel. However, we have found that with pressures no greater than those required for welding lining sheets (which are always thin), such a strut is unnecessary. When the upper head of a vessel is being welded, hoist 12 and spider 17 cooperate to transmit successfully this reactive force to the vessel; when the lower head is being welded, the weight of the apparatus and spider 17 cooperate to perform the same function.

It is to be understood that not only track 61 but also spider legs 46—46 and lateral arms 20—21, are to be interchangeable with similar members of different dimensions, for adapting the machine to the various standard sizes of such vessels as it is desired to weld.

A working platform may be provided on spider 17.

When not in use, the above described apparatus will ordinarily be stored in partially disassembled condition. As may be seen from the drawings, assembly and disassembly are simple and easy and the task of passing parts of the machine through a manhole and assembling them within a vessel is not difficult.

The inner surface of the vessel being thoroughly sand-blasted and cleaned, and the welding apparatus having been assembled with the vessel, the apparatus may be raised by hoist 12 to the point where work is to be begun. The sheets of lining material, which should be of as large size as may be passed through the manhole and of any suitable shape, such as rectangles for the cylindrical portions of the vessel and gores or figures approximately halves (or other sectors) of annuli for the heads, may be fitted properly in position as welding progresses.

In welding the lining in place in a vessel, the exact order of procedure is not of importance but, for example, it might be desired to work first on the heads. In this case the device of Fig. 2 is assembled and raised to the top of the vessel. Then the tripod legs 46—46 are adjusted in length so that their shoes firmly grip the walls of the vessel, holding the suspended apparatus against lateral movement. The exact vertical adjustment may then be made by means of crank 24 and the actual welding begun, working around the center of the head in concentric circles, the position of the welding head being changed by means of crank 34 and truck 62. When the welding head is in position for a weld, the operator presses the switch 56 on control cable 55 and the weld is carried to completion by the automatic controls in cabinet 54, as indicated above.

The lining of the upper head being completed, it might be desirable to weld the lower head before removing the track 61. To accomplish this the apparatus is lowered to the bottom of the vessel and inverted and then suspended by lower eye 18. In a small vessel this inversion may require partial disassembly of the apparatus. By the same procedure as for the upper head the lower head is welded.

Then, the machine still inverted, it might be desirable to assemble the apparatus of Fig. 1 to weld the lower portion of the cylindrical walls which would not be reached by the apparatus in normal position. Framework 60 and track 61 are removed, being replaced by bucking bar 20 and supporting arm 21. The welding head is removed from truck 62 and bolted to the outer end of arm 21. The bucking bar is adjusted to proper length by means of adjustment 44, the spider legs are adjusted (if this has not been done already) so that the axes of cylindrical member 13 and of the vessel approximately coincide, and welding proceeds in the manner indicated, movements of the welding head being made by means of cranks 34 and 24.

The lower portion of the vessel being completed, the apparatus may be restored to normal position and the remainder of the cylindrical walls lined, working from bottom up or from top down as the operator prefers.

When the welding head has been moved the limit of its vertical motion as determined by the length of member 13, the entire apparatus may be moved by means of hoist 12 sufficiently to permit a new portion of the wall to be worked upon. Prior to such movement of the apparatus one of the spider leg adjustments 47—47 is loosened, which, provided wheel 33 has been retracted, permits vertical movement to take place unhindered. It should be noted that if a spider of only three legs is used, it is necessary to release and subsequently tighten but one of the spider-leg adjustments at the time of moving the apparatus, but otherwise two or more legs would require adjustment each time.

As will appear from the above description of our apparatus and the method of using it, its use makes possible the efficient welding of corrosion-resistant linings to vessels such as described with a great increase in convenience and in economy of time and labor over all methods previously in use. The well known advantages of resistance spot welding, such as speed of operation and lack of surface contamination of materials, are taken advantage of. Spot welders previously in use are unfitted for this purpose, either by being incapable of working within such a vessel as described or by being slow and inefficient, without suitable means of being held in position or of supplying adequate and controlled pressure to the electrodes.

It should be noted that in our apparatus all the requirements of efficient resistance welding are met, such as controlled and equalized electrode pressure, a short and completely water-cooled secondary circuit, automatic control of any desired type, and accurate placing of the electrodes on the work. Furthermore, we are able to utilize the superior speed of duplex welding. These virtues are standard in welders capable of working only in the open, but our apparatus incorporates them in a machine capable of doing rapid and efficient work within a closed vessel.

It is to be understood that the particular embodiment of our invention herein described is exemplary only and that we reserve the right to employ such changes as come within the scope of the appended claims.

We claim as our invention:

1. A device for welding lining sheets to the inner surfaces of closed vessels, comprising: a resistance-welding head; means for applying controlled pressure to said head; adjustable means for holding said head in operative position against the inner surface of the wall of a vessel; means for transmitting the reactive force of said pressure means to the wall of said vessel; and means for supplying controlled electric current of required magnitude and voltage to said welding head.

2. A device for welding lining sheets to the inner surfaces of closed vessels, comprising: a duplex spot welding head which includes pressure means; attached to said head a lateral supporting bar; a bucking bar opposed to, rigidly connected with, and substantially in line with said supporting bar; means for suspending within a vessel the rigid assembly which includes said welding head, said supporting bar, and said bucking bar; a welding transformer and means for conducting electric current from the secondary of said transformer to the electrodes of said welding head; means for suspending said transformer within said vessel; means for actuating controlledly the pressure means of said welding head; and means for supplying controlled electric current to the primary coil of said transformer.

3. A device substantially as described in claim 2, in combination with a vertically disposed cylindrical member; a sleeve adapted to slide upon said cylindrical member and centrally supporting said rigid assembly; and means for optionally moving and holding fixed said sleeve upon said cylindrical member.

4. A device substantially as described in claim 2, in combination with a wheel mounted on said welding head and adapted to frictionally engage the wall of said vessel; means for turning said wheel; and means for retracting said wheel from engagement.

5. A device for welding lining sheets to the inner surfaces of closed vessels, comprising: a duplex spot-welding head which includes pressure means; a carriage attached to said head; a track adapted to direct the motion of said carriage substantially parallel to the inner surface of a vessel; means for locking said carriage immovably to said track; means for supporting said track in operative position within said vessel; a welding transformer and means for conducting electric current from the secondary of said transformer to the electrodes of said welding head; means for suspending said transformer near said welding head; means for actuating controlledly the pressure means of said welding head; and means for supplying controlled electric current to the primary coil of said transformer.

6. A device substantially as described in claim 5, in which the means for supporting said track in operative position comprise suspension means, a pivotally attached spider comprising a central body and a plurality of legs adjustable in length, and a framework capable of being disassembled; in combination with means for rotating said track about the axis of said vessel.

WAYNE A. HOWARD.
TURNER C. SMITH.